United States Patent
Emrich et al.

(10) Patent No.: US 9,643,350 B2
(45) Date of Patent: May 9, 2017

(54) WET-OUT PREVENT METHOD USING LAMINATE FOR INJECTION MOLDING PROCESS

(71) Applicant: Ford Global Technologies, LLC, Dearborn, MI (US)

(72) Inventors: Jason Robert Emrich, Sterling Heights, MI (US); Inshirah Hillawi, Canton, MI (US); Megan May Lovejoy, Dearborn, MI (US); Steven J. Antilla, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 817 days.

(21) Appl. No.: 14/023,974

(22) Filed: Sep. 11, 2013

(65) Prior Publication Data

US 2015/0069644 A1 Mar. 12, 2015

(51) Int. Cl.
*G02B 6/00* (2006.01)
*B29C 45/16* (2006.01)
*B29D 11/00* (2006.01)
*B29K 101/00* (2006.01)
*B29L 11/00* (2006.01)

(52) U.S. Cl.
CPC ...... *B29C 45/1642* (2013.01); *B29C 45/1671* (2013.01); *B29D 11/00701* (2013.01); *B29K 2101/00* (2013.01); *B29L 2011/0075* (2013.01)

(58) Field of Classification Search
CPC ........ B29C 2045/1692; B29C 45/1642; B29C 45/14795; B29D 11/00663; G02B 6/00; G02B 6/0011
See application file for complete search history.

(56) References Cited

U.S. PATENT DOCUMENTS

| 5,982,969 A | 11/1999 | Sugiyama et al. |
| 2007/0047246 A1 | 3/2007 | Barowski et al. |
| 2010/0288073 A1* | 11/2010 | Shin .................. B29C 44/08 74/552 |
| 2012/0055770 A1* | 3/2012 | Chen .................. H01H 13/83 200/310 |
| 2013/0026504 A1 | 1/2013 | Marx et al. |

FOREIGN PATENT DOCUMENTS

| EP | 2466349 | 6/2012 |
| WO | 2012138123 | 10/2012 |

OTHER PUBLICATIONS

"Lumisheet," LED Light Collection 2013 Technical Specifications, Evo-Lite-Lumisheet 2013, p. 1-p. 17, www.evo-lite.com.

* cited by examiner

*Primary Examiner* — Galen Hauth
(74) *Attorney, Agent, or Firm* — Vichit Chea; Price Heneveld LLP

(57) ABSTRACT

A light guide system includes a light guide and a carrier substrate having a barrier layer disposed therebetween. The barrier layer is introduced during a dual injection process to provide a permeable barrier between a first resin, used to form the light guide, and a second resin used to form the carrier substrate. The barrier layer allows for the first and second resins to bond, while acting as a wet-out inhibitor between the resins. The molded dual injection light guide system of the present invention provides for a unitary light guide and carrier substrate that has been molded with a barrier layer such that wetting out of a surface of the light guide is prevented along with the deleterious effects wetted out surfaces have on light transmission.

10 Claims, 2 Drawing Sheets

WET-OUT PREVENT METHOD USING LAMINATE FOR INJECTION MOLDING PROCESS

FIELD OF THE INVENTION

The present invention generally relates to a method of making a light guide system, and more specifically, to a method of making a light guide system wherein a light guide and a carrier substrate are formed simultaneously using a dual injection method.

BACKGROUND OF THE INVENTION

Current light guide systems require a lens, which is usually in the form of a light guide, a light panel or a light pipe, and a carrier member which is coupled to the lens and includes attachment features that allow a user to fasten the light guide system to surrounding commodities. Currently, the lens or light guide cannot be dual injected with an opaque plastic used to form the carrier substrate as the resin materials for the light guide and the carrier will wet-out during the dual injection process. The use of a dual injection process for creating a unitary light guide system having a lens and a carrier has also been complicated by the fact that the resins used to make the lens and the carrier must have similar material properties for the dual injection process. The similar material properties required for use in a dual injection process substantially diminishes the property for light reflection on the inner surfaces of the transmissive clear light pipe lens. Thus, the amount of "bounce" within the clear light guide or lens is diminished, such that the amount of light emitted from the light guide at the extreme ends of the light guide is substantially diminished. Further, the normal attenuation formula for the clear resin used to form the lens component of the light guide system is significantly increased resulting in the loss of light transmission through the lens. This increased attenuation formula is generally due to absorption of light through the opaque resin used to form the carrier component of the light guide system that is co-injected or co-extruded with the lens component. Thus, a method of forming a light guide system is desired, wherein the lens or light guide component and the carrier component are co-formed in such a manner that the resins used to make each component are able to bond to one another, but not wet-out during formation.

SUMMARY OF THE INVENTION

One aspect of the present invention includes, a method of forming a light guide system, comprising the steps of injecting a first resin suitable for forming a light guide into a first portion of a mold and injecting a second resin suitable for forming a carrier substrate into a second portion of the mold. A barrier layer is inserted into the mold to prevent wet-out between the first and second resins. The resins are then cured to form a unitary light guide system.

Another aspect of the present invention includes, a method of forming a light guide system, comprising the steps of providing a mold having a barrier layer disposed between first and second portions of the mold. A first resin suitable for forming a light guide is injected into the first portion of a mold, and a second resin suitable for forming a carrier substrate is simultaneously injected into the second portion of the mold. The resins are then cured to form a unitary light guide system.

Yet another aspect of the present invention includes, a method of forming a light guide system, comprising the steps of providing a mold and inserting a barrier layer in the mold. A first resin is injected into a first portion of a mold, and a second resin is injected into a second portion of a mold. The first resin is bonded to the second resin without forming wetting out the resins at an interface of the resins. A light guide is formed with the first resin and a carrier substrate is formed with the second resin to form an overall unitary light guide system.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
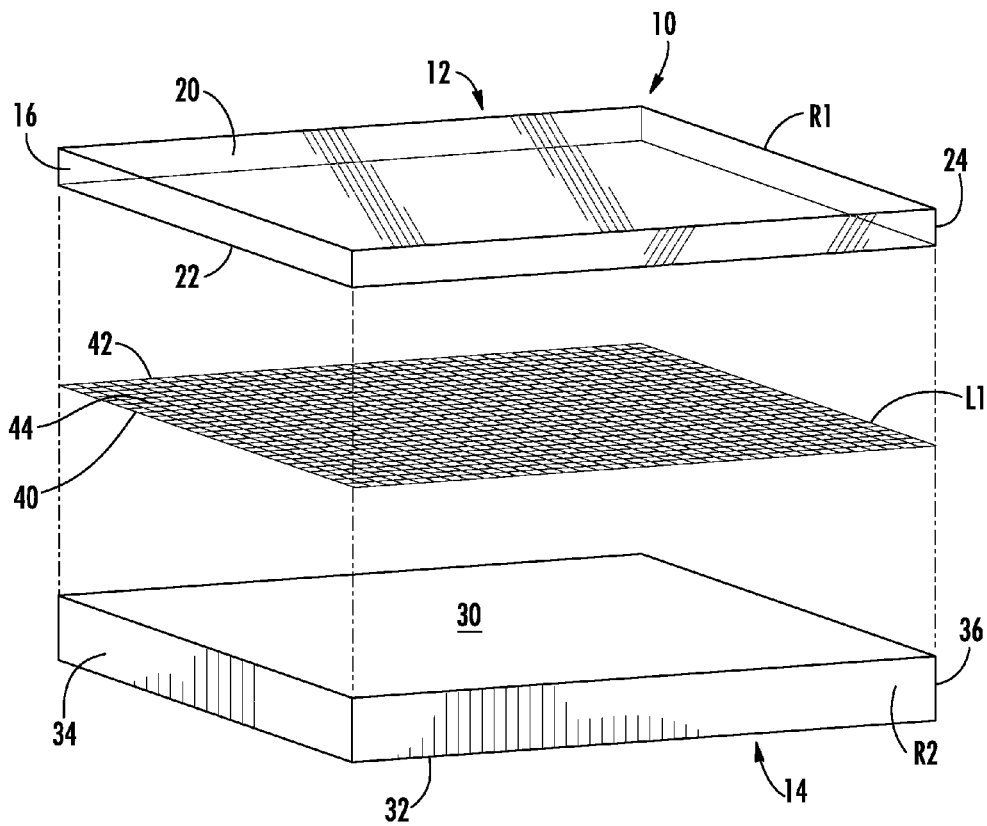
FIG. 1 is an exploded perspective view of a first resin layer and a second resin layer having a laminate layer disposed therebetween.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a light guide system according to one embodiment of the present invention. As shown in FIG. 1, the light guide system includes a first resin layer R1 and a second resin layer R2 which, in the embodiment of FIG. 1, are disposed on either side of a laminate layer L1. The resin layer R1 is a first resin layer which is suitable for forming a transmissive light guide 12 for receiving light as emitted from a light source, as further described below. The first resin layer R1 may be a rigid material that is comprised of a curable material such as a polymerizable compound, a mold in clear (MIC) material or mixtures thereof. Acrylates are also commonly used for forming rigid resin layers, as well as poly (methyl methacrylate) (PMMA) which is a known substitute for glass. A polycarbonate material may also be used for the first resin layer R1 in an injection molding process. Further, the resin layer R1 may be used to form a flexible light guide system, wherein a suitable flexible material R1 is used to create the light guide 12. Such materials include urethanes, silicone, thermoplastic polyurethane (TPU) or other like optical grade flexible materials. Whether the light guide 12 is a flexible light guide or a rigid light guide, the light guide 12, when formed, is substantially optically transparent and capable of transmitting visible light. In this way, the light guide 12 is a lens for the light guide system 10. The light guide 12 may be referred to as a light pipe, a light plate, a light bar or any other light carrying substrate made from a clear or translucent plastic.

Figure 2:
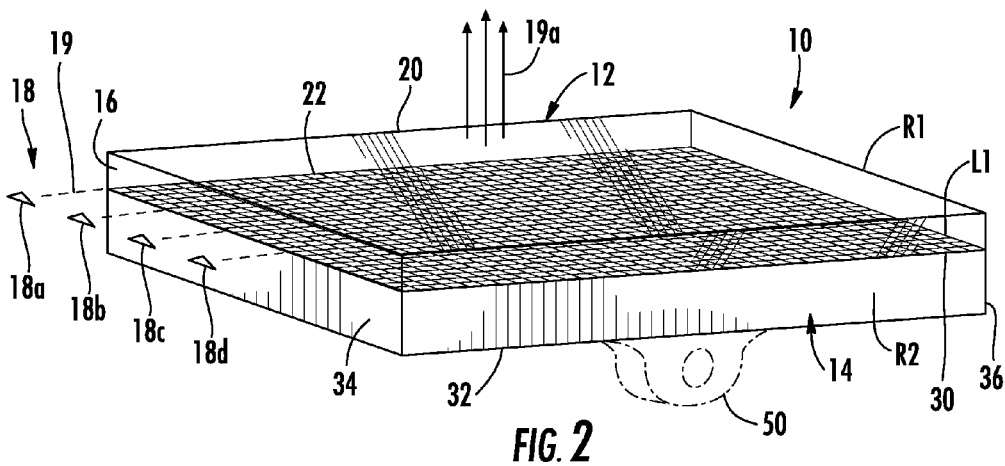
FIG. 2 is a perspective view of the resin layers of FIG. 1 coupled about the laminate layer.

A second resin layer R2 is an external layer which forms a carrier substrate 14 for supporting the clear lens light guide 12 shown in FIG. 2. The carrier substrate 14 is comprised of a resin R2 which is typically a polycarbonate material that may also be a blend of a polycarbonate material and an ABS plastic. The carrier substrate 14 is generally an opaque resin that is chemically compatible to the resin R1 used to create the light guide 12 of the light guide system 10. Thus, both resins R1 and R2 are suitable for dual-shot injection molding in a single process for forming a unitary light guide system 10 of the present invention.

Referring now to FIG. 2, the light guide system 10 is shown having an optically transparent light guide 12 that is adapted to receive light at an input end 16 from a light source 18. As shown in the embodiment of FIG. 2, the light source 18 includes a plurality of light emitting diodes (LEDs) 18a -18d. The LEDs 18a-18d are positioned such that light emitted from the LEDs 18a-18d enters the input end 16 of the light guide 12. The light guide 12 is designed to provide internal reflection of the light 19 entering the light guide 12, such that the light 19 is reflected along the upper surface 20 and lower surface 22 of the light guide 12 as the light 19 travels along the length of the light guide 12 with minimal light loss. In order to minimize the amount of light lost within the light guide 12, the light guide 12 has an index of refraction that is higher than the index of refraction of the carrier material R2 of the carrier substrate 14. The index of refraction describes how light propagates through a particular medium. Thus, in the light guide system 10 of the present invention, light 19 emitting from the light source 18 is reflected within the body of the light guide 12 with nearly total internal reflection between the upper and lower surfaces 20, 22 and with little absorption. Thus, the light 19 entering light guide 12 exits the upper surface 20 of the light guide 12 as indicated by arrows 19a. The light 19a exiting the upper surface 20 of the light guide 12 is contemplated to have been reflected multiple times within the body portion of the light guide 12. The upper surface 20 of the light guide 12 can be etched or otherwise textured to increase the effective surface area, thereby causing more light 19a to exit the light guide 12 at select etched regions. Further, the texturing of the upper surface 20 of the light guide 12 can be designed to evenly diffuse the light 19a as it exits the light guide 12, thereby minimizing variations in the brightness of the light 19a emitting from the upper surface 20 of the light guide 12.

As noted above, the known methods of providing a light guide and a carrier substrate involves the bonding of a preformed light guide to a preformed carrier by adhesion, such as by using a double-sided tape, or by mechanical connections such as brackets that are formed into the carrier substrate. The present invention seeks to avoid these connector mechanisms by providing a method of dual injection, co-molding or co-extrusion for forming both the light guide 12 and the carrier substrate 14 in a single process to form a unitary light guide system 10. By co-molding the light guide 12 and the carrier substrate 14, in a dual injection process, for example, gaps that are typically formed in the prior art connection methods are greatly reduced or altogether eliminated. This provides a thinner overall profile for the light guide system 10 of the present invention which can be a critical feature for a light guide system as used in applications having limited free space in an area where ambient lighting is desired. Further, the minimized gaps between the light guide 12 and the carrier substrate 14 of the present invention reduces light leakage between the substrates in use.

Thus, the present invention is adapted to streamline the assembly of a light guide system 10 by using methods such as dual injection or co-extrusion to co-mold a light guide system in a single process step. As noted above, the resin material R1 of the light guide 12 and the resin material R2 of the carrier substrate 14 currently cannot be dual injected due to wet-out of the resins R1 and R2 during the dual injection process. As used throughout this disclosure, the term, "wet-out" is used to refer to a complete surface integration of contact surfaces disposed on both the light guide 12 and the carrier substrate 14. As best shown in FIG. 1, the light guide 12 includes upper and lower surfaces 20, 22 and front and rear edges 26, 24. Similarly, the carrier substrate 14 includes upper and lower surfaces 30, 32 and front and rear edges 34, 36. In this configuration, the lower surface 22 of the light guide 12 and the upper surface 30 of the carrier substrate 14 comprise the contact surfaces between the light guide 12 and the carrier substrate 14 which will contact each other during the dual injection process.

In producing a light guide system using a dual injection method, it is important that the resins, such as resins R1 and R2, shown in FIGS. 1 and 2, have similar material properties for use in a dual injection process. To successfully create injection molded parts, an understanding of the process-related issues is necessary in order to provide a structurally sound part. Thus, the material of the resins R1 and R2 need to be similar in aspects such as, the ability to fill the mold, the ease of part ejection from the mold, the ease of resin injection, the tendency to flash, and the potential for warp, sink, or void creation within a mold. Thus, in order to successfully create a light guide system using a dual injection process, the resins R1 and R2 should be from the same chemical family which can lead to wet-out issues between the resins R1 and R2. As such, when resins are dual injected having similar material properties, wet-out will occur at the contact surfaces, such as contact surfaces 22 and 30 of the light guide 12 and the carrier substrate 14. Such wet-out creates unwanted optical effects, such as variation in light intensity across the light guide system. Therefore, the light guide system 10 of the present invention includes a laminate barrier which acts as a wet-out inhibitor as further described below.

The incorporation of a laminate barrier L1 substantially eliminates wet-out between the resins R1 and R2 during a dual injection process, such that the optical transmission qualities of the light guide 12 are preserved in the assembled light guide system, as shown in FIG. 2. Without this barrier, wet-out between the resins negates the ability of the transmissive clear light guide 12 to properly reflect light off the inner surfaces of the light guide 12 thus, the amount of "bounce" within the light guide 12 is substantially reduced. This reduction in bounce leads to reduced amounts of light within the light guide, and therefore provides a light guide having an overall loss of light transmission through the upper surface. This loss of light transmission is generally due to absorption through the opaque material R2 that is co-injected with the translucent material R1.

Referring again to FIGS. 1 and 2, the barrier layer L1 is a laminate that is disposed between the light guide 12 and the carrier substrate 14 that is a perforated or permeable barrier that allows the resins R1 and R2 of the light guide 12 and the carrier substrate 14 to bond during the dual injection process, while allowing the resins to bond through the permeable layer L1, the barrier layer L1 also act as an inhibitor to resin wet-out such that the resins R1 and R2 do not completely wet-out. In this way, the barrier L1 allows the resin materials R1, R2 to substantially bond to one another without effecting the light reflection on the inner surfaces of the light guide 12. The barrier layer L1 may be comprised of a number of different materials so long as the barrier layer allows for sufficient bonding between the light guide 12 and carrier substrate 14 while preventing wet-out between the resins R1 and R2, such that negative optical effects are also avoided. As shown in FIG. 1, the barrier L1 is a screen or mesh-like substrate having a plurality of interconnected structural members 40, 42 that provide for a perforated surface 44. The perforated surface 44 allows for the like materials of the light guide 12 and the carrier substrate 14 to bond through the perforated surface 44. The barrier L1 may also be comprised of a reflective metalized film having a perforated surface that would allow the resins R1 and R2 to bond while also providing more internal reflection within the light guide 12. Further, a textured plastic reflective film may be used to create the barrier L1 wherein the reflective properties of the textured plastic or the reflective metalized film will help to ensure that the bounce or reflection on the inner surfaces of the transmissive clear light guide 12 are maintained throughout the length of the light guide 12.

Figure 3:
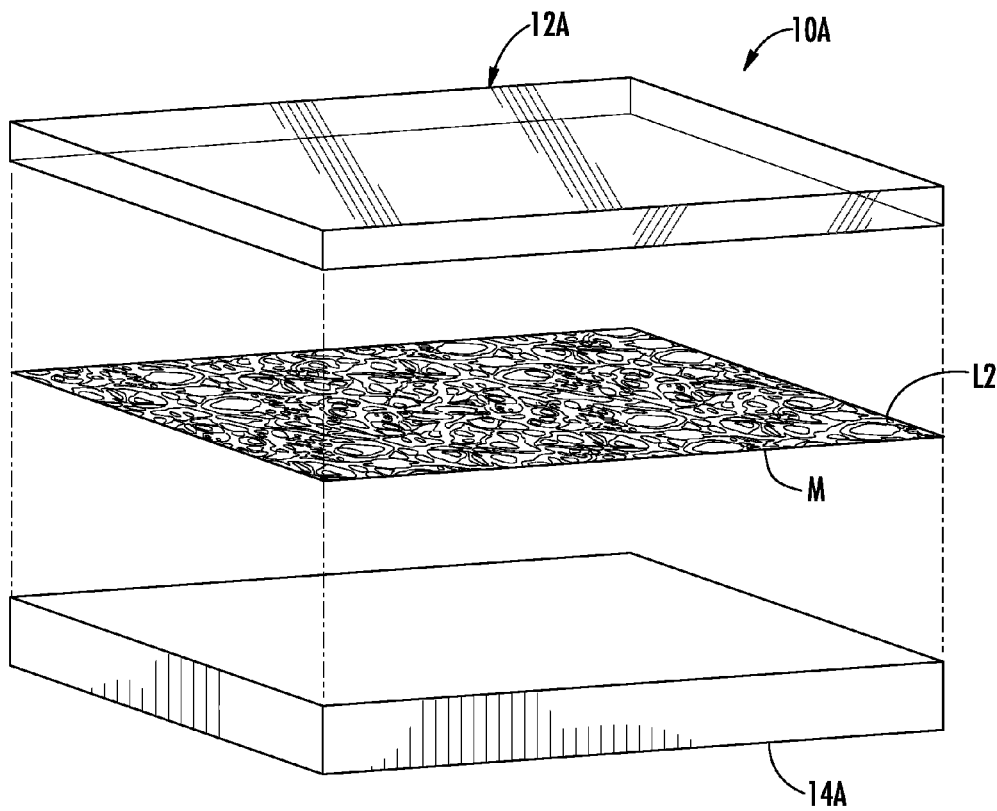
FIG. 3 is an exploded perspective view of a first resin layer and a second resin layer having a sacrificial barrier disposed therebetween.
Figure 4:
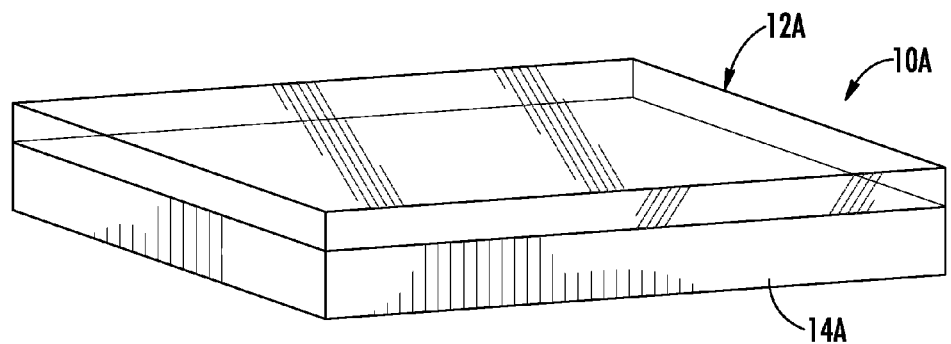
FIG. 4 is a perspective view of the resin layers of FIG. 3 as assembled, wherein the sacrificial layer of FIG. 3 has been consumed in the forming process.

Referring now to FIGS. 3 and 4, the barrier layer may also be comprised of a sacrificial material that is generally consumed during the injection molding process, yet leaves a texture or residue that disturbs the bonding surfaces between the resins R1, R2. As shown in FIGS. 3 and 4, a barrier layer L2 is comprised of a consumable material or film, which may be an organic material such as a perforated mycelium-based substrate that is adapted to be consumed during the dual injection process. Thus, as shown in FIG. 4, an assembled light guide system 10A is shown having a light guide 12A bonded to a carrier substrate 14A, wherein the laminate barrier L2, comprised of an organic material M, has dissolved or otherwise been consumed during the injection molding process to provide a light guide system 10A without a permanent laminate barrier disposed between the light guide 12A and the carrier substrate 14A. Suitable organic materials for use as the laminate barrier L2 include laminates comprised substantially of various organic materials, such as cacao shells, cacti, coconut fiber, straws, hemp, seed hulls, paper products, rice paper and by-products thereof. Other organic or consumable materials will be recognized by one skilled in the art, so long as the material is self-sacrificing and configured to be consumed or "burned up" with the heat of the resins R1 and R2 as injected during a dual injection process. In this way, the barrier layer L2 is adapted to be consumed, yet disturb the interface of resins as bonded therethrough to provide a texture to the bonding surface for reflecting light received in the light guide 12A. Thus, the light guide 12A is substantially protected from wet out between the resins, yet bonding of the resins is still allowed to occur.

In a dual injection process, a light guide system, such as light guide system 10 of FIG. 2, can be produced by first providing a rigid mold made of plastic, metal, ceramic, or otherwise rigid material. The rigid mold may include first and second cavity portions for dual injection of resin materials, such as resin materials R1, R2 shown in FIGS. 1 and 2. In providing a laminate layer, such as laminate layer L1 shown in FIGS. 1 and 2, a rigid laminate layer, such as a wire mesh or other plastic material, can be provided having a perforated surface to allow flowthrough for the chemical bonding of the resins R1 and R2 incorporated in the dual injection process. Such a rigid barrier layer can be inserted into the rigid mold between first and second mold portions prior to the dual injection of the resins R1 and R2, such that the barrier is situated in the mold to be disposed between contact surfaces 22 and 30 of the formed light guide 12 and carrier substrate 14. Again, as noted above, the resins R1 and R2 as used in the dual injection method are chemically compatible including similar coefficients of thermal expansion so that bonds formed during the dual injection process are maintained during contraction and expansion of the integrally formed unitary light guide system 10. As the bonds are formed between the resin R1 and resin R2, the resins are cured to provide a light guide 12 and a carrier substrate 14. As specifically shown in FIG. 2, the carrier substrate 14 may include attachment features 50 which are used to attach the light guide system 10 to the surrounding commodities in assembly. Such attachment features may be included in the mold. For instance, the light guide system 10 can be used for illuminating particular parts of a vehicle interior with the attachment feature 50 being used to secure the light guide system 10 to a particular location disposed within the vehicle interior. As noted above, the carrier substrate 14 can be comprised of a resin material R2 that provides the structural rigidity necessary for attachment of the light guide system 10 to surrounding commodities. The resin R2 generally provides for an opaque carrier substrate that can have varied reflective properties as necessary for proving a light guide system 10 having a specific illumination effect.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of forming a light guide system, comprising the steps of:
    injecting a first resin suitable for forming a light guide into a first portion of a mold;
    injecting a second resin suitable for forming a carrier substrate into a second portion of the mold;
    inserting a barrier layer in the mold to prevent wet-out between the first and second resins, wherein the barrier layer is inserted into the mold before injecting the first and second resins; and
    curing the resins to form a unitary light guide system, wherein the unitary light guide system includes a light guide formed from the first resin and a carrier substrate formed from the second resin, and further wherein the light guide and carrier substrate are joined and formed in a dual injection process.

2. The method of claim 1, wherein the barrier layer is a permeable layer.

3. The method of claim 1, wherein the barrier layer is comprised of a sacrificial organic material.

4. The method of claim 3, further comprising the step of consuming the barrier layer while injecting the first resin.

5. A method of forming a light guide system, comprising the steps of:
    providing a mold;
    inserting a sacrificial barrier layer in the mold;
    injecting a first resin into a first portion of a mold;
    injecting a second resin into a second portion of the mold;
    bonding the first resin to the second resin without wetting out the resins;
    forming a light guide with the first resin; and
    forming a carrier substrate with the second resin.

6. The method of claim 5, further comprising the step of:
    preventing wet-out between the first and second resins during the bonding step using the barrier layer.

7. The method of claim 6, wherein the first resin and second resin exhibit similar chemical properties suitable for a dual injection process.

8. The method of claim 7, wherein the light guide is formed in a first shot of the dual injection process and further wherein the carrier substrate is formed during a second shot of the dual injection process.

9. The method of claim 8, wherein the barrier layer is a permeable layer.

10. The method of claim 5, wherein the bonding of the first and second resins forms a unitary light guide system.

* * * * *